United States Patent
Arzoumanian et al.

(10) Patent No.: US 8,702,149 B2
(45) Date of Patent: Apr. 22, 2014

(54) DASHBOARD SUPPORT, AND METHOD FOR THE PRODUCTION OF A DASHBOARD SUPPORT

(71) Applicant: Benteler Automobiltechnik GmbH, Paderborn (DE)

(72) Inventors: Kegham Arzoumanian, Paderborn (DE); Evin List Clausen, Lojt Kirkeby Abenra (NO); Andreas Stosch, Salzkotten (DE); Jochem Grewe, Salzkotten (DE); Stefan Hilgenberg, Schlangen (DE); Roman Bierkamp, Erwitte (DE); Martin Steffens, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/719,974

(22) Filed: Dec. 19, 2012

(65) Prior Publication Data
US 2013/0154300 A1 Jun. 20, 2013

(30) Foreign Application Priority Data

Dec. 20, 2011 (DE) .................. 10 2011 056 699

(51) Int. Cl.
*B62D 25/14* (2006.01)

(52) U.S. Cl.
USPC .............................................. 296/72; 29/428

(58) Field of Classification Search
USPC .............. 296/70, 72, 193.06, 193.02; 29/428, 29/525.11; 248/220.41, 225.11
See application file for complete search history.

(56) References Cited

U.S. PATENT DOCUMENTS

| 6,276,740 | B1 | 8/2001 | Mellor et al. |
| 7,134,704 | B2 * | 11/2006 | Fischer ........................... 296/72 |
| 7,516,986 | B2 | 4/2009 | Kokubo |
| 7,810,873 | B2 * | 10/2010 | Hitz et al. ................ 296/193.02 |
| 8,256,830 | B2 * | 9/2012 | Hitz et al. ................ 296/193.02 |
| 8,449,017 | B2 * | 5/2013 | Boivin et al. .............. 296/180.4 |
| 2004/0036310 | A1 * | 2/2004 | Mills ................................ 296/72 |
| 2004/0094986 | A1 * | 5/2004 | Landvik et al. ................. 296/70 |
| 2005/0134090 | A1 * | 6/2005 | Kring et al. .............. 296/193.02 |
| 2008/0054680 | A1 | 3/2008 | Ellison et al. |
| 2009/0038156 | A1 * | 2/2009 | Hitz et al. ..................... 29/897.2 |
| 2009/0140553 | A1 * | 6/2009 | Hitz et al. ..................... 296/208 |
| 2009/0302641 | A1 * | 12/2009 | Bierkamp et al. ........ 296/193.02 |
| 2011/0109122 | A1 | 5/2011 | Clausen et al. |
| 2011/0121587 | A1 | 5/2011 | Handing et al. |
| 2011/0278876 | A1 | 11/2011 | Arzoumanian et al. |

FOREIGN PATENT DOCUMENTS

| DE | 297 06 371 U1 | 7/1997 |
| DE | 698 27 823 T2 | 12/2005 |
| DE | 11 2005 001 036 T5 | 5/2007 |
| WO | WO 2011/058270 A1 | 5/2011 |

\* cited by examiner

*Primary Examiner* — Lori Lyjak
(74) *Attorney, Agent, or Firm* — Henry M Feiereisen LLC (57) ABSTRACT

In a method for the production of a dashboard support for a motor vehicle, a blank is cut from an extruded profile part. The blank is then trimmed and shaped to form a mount which is connected to an end of a crossbeam for allowing subsequent coupling of the crossbeam via the mount to an A-pillar of the motor vehicle.

23 Claims, 6 Drawing Sheets

DASHBOARD SUPPORT, AND METHOD FOR THE PRODUCTION OF A DASHBOARD SUPPORT

CROSS-REFERENCES TO RELATED APPLICATIONS

This application claims the priority of German Patent Application, Serial No. 10 2011 056 699.6, filed Dec. 20, 2011, pursuant to 35 U.S.C. 119(a)-(d), the content of which is incorporated herein by reference in its entirety as if fully set forth herein.

BACKGROUND OF THE INVENTION

The present invention relates to a dashboard support, and to a method for the production of a dashboard support.

The following discussion of related art is provided to assist the reader in understanding the advantages of the invention, and is not to be construed as an admission that this related art is prior art to this invention.

Modern motor vehicles have many driver assist systems as well as comfort and safety systems which are predominantly operated from the inside, in particular via the driver or passenger seats of a motor vehicle. Design features whether relating to the outer look or the interior space gain also increasingly on importance. For that reason, instrument panels, arranged in the motor vehicle between the front A-pillars beneath the windshield, are manufactured of plastic materials and sometimes covered with leather or other coating materials so as to receive a pleasing surface. To stiffen the instrument panel and to render it suitable for supporting various components, a dashboard support is arranged between the A-pillars. The dashboard support represents an elongate, rod-like structure having various mounting areas, for example, for steering column, airbags, glove compartment, heads-up display, navigation system and cable harness. Dashboard supports are typically coupled with the engine compartment rear bulk or the transmission tunnel for increase in stiffness.

Motor vehicle parts are normally manufactured using manipulators or industrial robots to maneuver the various body components. The various parts are hereby assembled by a multi-stage fully automated process, requiring the parts to be aligned relative to one another for subsequent joining by welding or bonding for example. The body components have openings for engagement by grippers of the manipulators or industrial robots for handling purposes. Dashboard supports are normally handled in the area of the mounting areas for movement and installation in the region of the A-pillars.

It would be desirable and advantageous to provide an improved method for the production of a dashboard support to obviate prior art shortcomings.

SUMMARY OF THE INVENTION

According to one aspect of the present invention, a method for the production of a dashboard support for a motor vehicle includes cutting a blank from an extruded profile part, trimming and shaping the blank to form a mount, and connecting the mount to an end of a crossbeam for allowing the crossbeam to be coupled via the mount to an A-pillar of the motor vehicle.

The present invention resolves prior art shortcomings by coupling a crossbeam with a mount which can be made from an extruded part profile in a particularly simple and cost-efficient manner. Both materials can be coupled with one another so as to be able to produce a dashboard support comprised of the crossbeam and mounts at the ends of the crossbeam. The crossbeam may, of course, also have further portions, clamps, protrusions or other coupling options for attachment parts. The crossbeam may hereby be configured of any shape. For example, the crossbeam may be of single-piece or multipart tubular configuration, or the crossbeam may be suitably shaped or profiled. Examples include C-shaped or U-shaped crossbeams.

According to another advantageous feature of the present invention, the extruded profile part may be made of light metal, e.g. aluminum, and the crossbeam may be made of light metal or steel. Currently preferred is the use of aluminum alloys of the 6000 series or 7000 series. The extruded profile part is produced primarily by an extrusion process and the material may be stored hot or cold.

According to another advantageous feature of the present invention, the extruded profile part may be cut to form two blanks. One blank can then be used for the driver side and the other blank for the passenger side, after being trimmed and shaped into the respective mounts.

According to another advantageous feature of the present invention, the mount and the crossbeam may be connected by a formfit or by a material joint. The formfit may be realized by providing the mount with a protrusion or recess for engagement with the crossbeam. Currently preferred is a connection between the mount and the crossbeam by a thermal joint, e.g. welding. Thus, the mount and the crossbeam, when made of different materials, can be connected.

According to another advantageous feature of the present invention, the extruded profile part may be a hollow section having two chambers disposed in spaced-apart relationship and connected with one another by a bridge to form a single-piece structure. For example, the hollow two-chamber profile part may have an H-shaped cross section. The chambers may have a rectangular cross section or a square configuration. Another example of a two-chamber profile part may be a T-shaped configuration in which case the bridge extends in prolongation of an outer wall of the chamber to an outer wall of the other chamber. The wall thickness of the chambers and the bridge may be the same or different.

The manufacture of the extruded profile part by way of extrusion provides a high degree of freedom for shaping. As a result, the wall thickness can be dimensioned to best suit the expected stress so that material can be saved during manufacture, thereby reducing production costs for the overall dashboard support. As material can be saved, the overall weight can be optimized which is of importance as far as weight of the motor vehicle is concerned because a decrease in weight of the motor vehicle results in a lesser fuel consumption and $CO_2$ emission.

According to another advantageous feature of the present invention, the extruded profile part can be cut to a length which is substantially commensurate with a length of the mount. A further trimming or cutting at the top end or bottom end of the mount being produced can thus be omitted. This measure also saves material and eliminates additional manufacturing steps to further positively affect production costs.

As described above, the extruded profile part may be cut to form two blanks. Advantageously, the two blanks can be cut as mirror images of one another. In other words, the cutting process produces from an extruded profile part two blanks as mirror images from one another. Each of the blanks can be made of one piece having a mounting chamber and an installation plate which projects from a side of the mounting chamber. The blank has thus, in side view, a generally P-shaped configuration. The long line of the P is hereby formed by the mounting chamber and the bulged protrusion of the P is formed by the installation plate. The installation plate is thus established by the bridge connecting the two chambers of the extruded profile part, with the mounting chamber corresponding to a chamber of the extruded profile part. The other blank that has been produced as a mirror image forms the other chamber as mounting chamber. Cutting is advantageously executed in the area of the bridge in transverse and/or longitudinal direction of the extruded profile part that has been cut to length.

According to another advantageous feature of the present invention, the blank can be cut from the extruded profile part through laser cutting or water jet cutting or by a punching process. Sawing may also be employed. Other examples include plasma jet cutting or milling. Using a punching process allows also the simultaneous formation of holes in the installation plate.

According to another advantageous feature of the present invention, the blank can be provided with mounting holes and/or installation holes and/or or handling holes. These holes or openings can be formed in the mounting chamber or also in the installation plate that laterally projects from the mounting chamber. Mounting holes may involve holes for later coupling of the instrument panel or dashboard which is supported by the dashboard support. These holes are advantageously provided in the installation plate, in particular in side flanges of the installation plate. Installation holes may involve holes for connection to the A-pillars of the motor vehicle, or holes that can be used for passage of e.g. a welding tool, for connecting the mount with the crossbeam. Handling holes may involve centering openings or openings for a centering mandrel to enable a manipulator or industrial robot to grab and maneuver the mounts and/or dashboard support via the mounts.

According to another advantageous feature of the present invention, the mounting holes and/or installation holes and/or or handling holes may be collared at least in one area thereof. Also the installation plate may be collared. As a result, the mount is further stiffened so it cannot warp when being installed in the motor vehicle. Further assembly steps then involve a coupling of the instrument panel or other components or structure to the mounts. Warping in this area may cause a subsequent connection outside of tolerance ranges so that refinishing is then required by hand or in part by machine. This adversely affects the automated manufacture, incurring additional production costs for the motor vehicle, in particular for the body construction. Stiffening in accordance with the invention prevents warping and ensures compliance with required production tolerances.

The mount of the dashboard support is normally installed in the motor vehicle so as to point in Z-direction. The mounting chamber of the mount thus points with its length axis substantially in Z-direction of the motor vehicle. Relating to the motor vehicle coordinate system, the mounting chamber has four walls, i.e. a front wall pointing in positive vehicle x direction, a rear wall pointing in negative vehicle X-direction, and an outer wall and an inner wall. On the driver side, the outer wall points in positive vehicle Y-direction and the inner wall points in negative Y-direction. On the passenger side, the outer wall points in negative vehicle Y-direction and the inner wall points in positive Y-direction. When the dashboard support is connected by a formfit in a motor vehicle, screw fasteners are used which extend through the mounts to threadably engage the A-pillars and/or the region of the A-pillars. Advantageously, the screw fasteners can be oriented in vehicle X-direction or in vehicle Y-direction for threaded connection with the A-pillars or vehicle body.

The following example describes in greater detail a threaded connection in vehicle X-direction. It will be understood that the principles described in the following description with respect to a threaded connection in vehicle X-direction are generally equally applicable to a threaded connection in which the length axes of the screw fasteners are substantially oriented in Y-direction.

Screw holes are formed in the front and rear walls of the mount and screw fasteners are inserted in the screw holes to attach the dashboard support in the motor vehicle. The screw fasteners primarily point in vehicle X-direction and are screwed to the A-pillars of the motor vehicle. The cross sectional geometry of the mount, especially of the mounting chamber, permits the use of high tightening torques to connect the screw fasteners with the vehicle body. The outer and inner walls of the respective mount support the screw fastener and form a resistance to the forces as the screw fastener is tightened.

To further increase stiffness of the mounting chamber in the area of the screw fasteners, an incision is made in the outer wall of the mount so as to form a flange which is bent to point into the interior space of the mounting chamber. Of course, the outer wall may be cut in such a way as to form two or more flanges in the area of a screw hole. It is also possible to make an incision in the inner wall in order to form at least one flange which is then bent to point into the interior space of the mounting chamber. Further provided are also slots on the inner wall for allowing a tongue-like counterpiece to temporarily move in so as to bend the flanges. In the event the screw fasteners are arranged in vehicle Y-direction, respective incisions are made in the front wall and/or rear wall of the mounting chamber and flanges are then bent to point into the interior space from there.

The flange bent into the interior space extends between the front wall and the rear wall so as to assume the function of a spacer to maintain a distance between front and rear walls of the mount. There is thus no need for providing other spacers or distance pieces which would complicate production and incur costs.

According to another advantageous feature of the present invention, the mount or blank is bent at a receiving end of the mounts on a part of the outer wall and/or inner wall and/or front wall and/or rear wall so as to form an attachment flange for an instrument panel. The attachment flange may be provided for attachment of peripheral components, such as safety holder for the on-board electronics, or as holding flange for a cable harness, or the like.

According to another aspect of the present invention, a dashboard support for a motor vehicle includes a crossbeam, and a mount connected on one end of the crossbeam and made in one piece.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 3a, b show different cross sectional views of the extruded profile part;

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
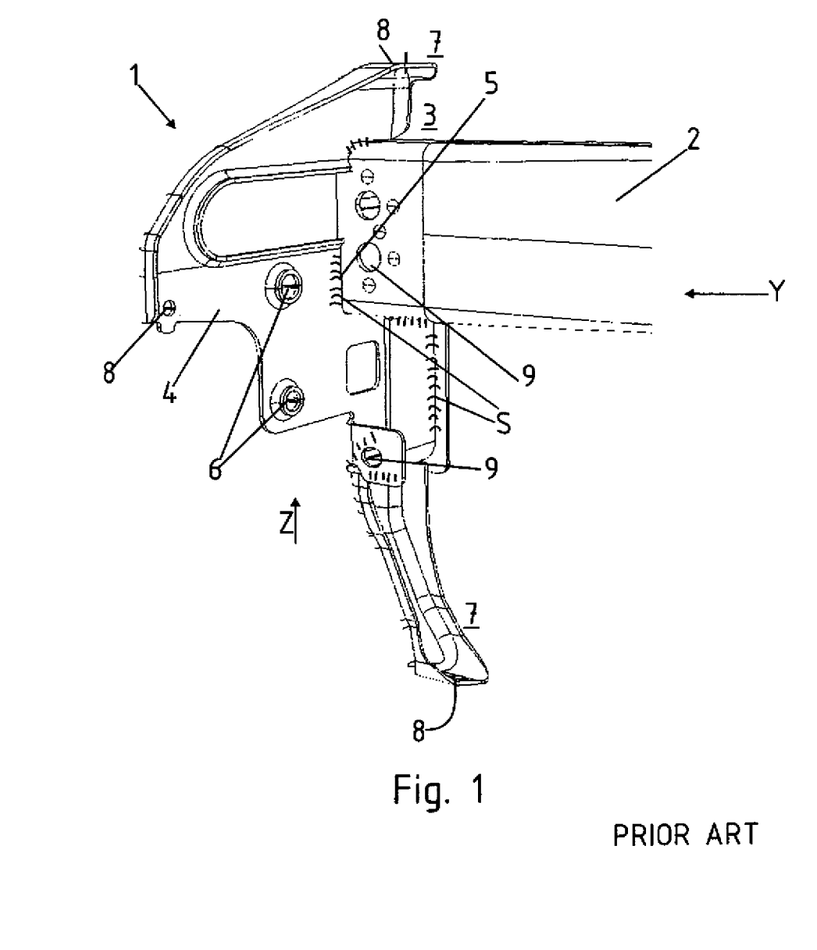
FIG. 1 is a schematic illustration of a section of a conventional dashboard support.

Turning now to the drawing, and in particular to FIG. 1, there is shown a schematic illustration of a section of a conventional dashboard support, generally designated by reference numeral 1. The dashboard support 1 has a crossbeam 2 and a mount 4 arranged on one end 3 of the crossbeam 2. The crossbeam 2 is configured as profile to extend in vehicle Y-direction as indicated by arrow Y. The mount 4 is configured as a sheet metal welding assembly and extends primarily in vehicle Z-direction as indicated by Z. The crossbeam 2 and the mount 4 are connected to one another by a formfit. The mount 4 has transport holes 6 for handling the dashboard support 1 by a not shown robot. At its outer ends 7, the mount 4 has mounting holes 8 for attachment to a not shown dashboard. Further shown are various welding seams S to interconnect various parts of the mount 4 which thus forms a welded structure. The crossbeam 2 and the mount 4 have in addition installation holes 9 for formfitting connection with a not shown A-pillar of a motor vehicle. This type of mount 4 is complicated to manufacture in order to meet the necessary precision and difficult to connect to the crossbeam 2. The various manufacturing operations impact dimensional precision and adversely affect the various mounting holes 8, installation holes 9 and transport holes 6.

Figure 2:
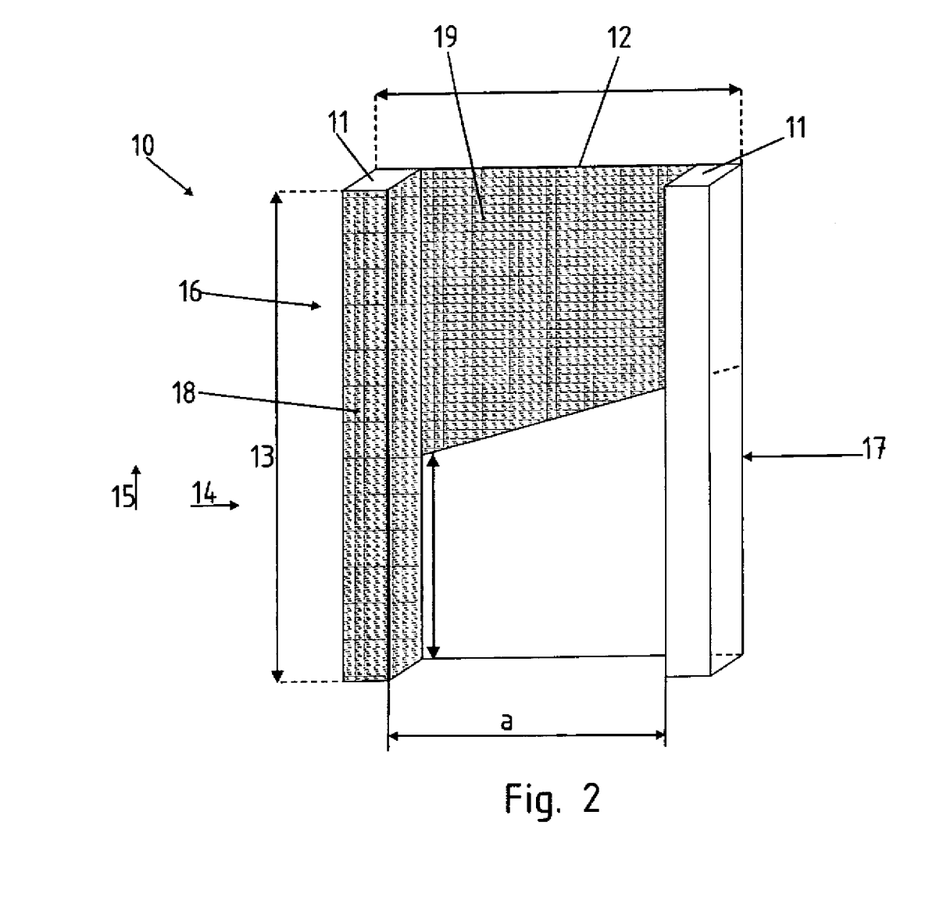
FIG. 2 is a schematic illustration of an extruded profile part cut to length as used in a method according to the present invention.

To address prior art shortcomings, an extruded profile part is used in accordance with the present invention which is shown in FIG. 2 and generally designated by reference numeral 10. The extruded profile part 10 has two chambers 11 and a bridge 12 to connect the chambers 11. The chambers 11 are spaced from one another by a distance a. The extruded profile part 10 has a length 13 which substantially corresponds to a length of a mount 40 (FIG. 4) to be produced. The extruded profile part 10 is machined in a transverse direction, indicated by arrow 14, and/or a longitudinal direction, indicated by arrow 15, in such a manner as to form a first blank 16 and a second blank 17 as mirror images of one another. The blank 16 has a mounting chamber 18 and an installation plate 19. The mounting chamber 18 is hereby formed by a chamber 11 of the extruded profile part 10 that has been cut to size, and the installation plate 19 is formed by part of the bridge 12 connecting the chambers 11. The blank 17 is formed in analogous manner.

Figure 3:
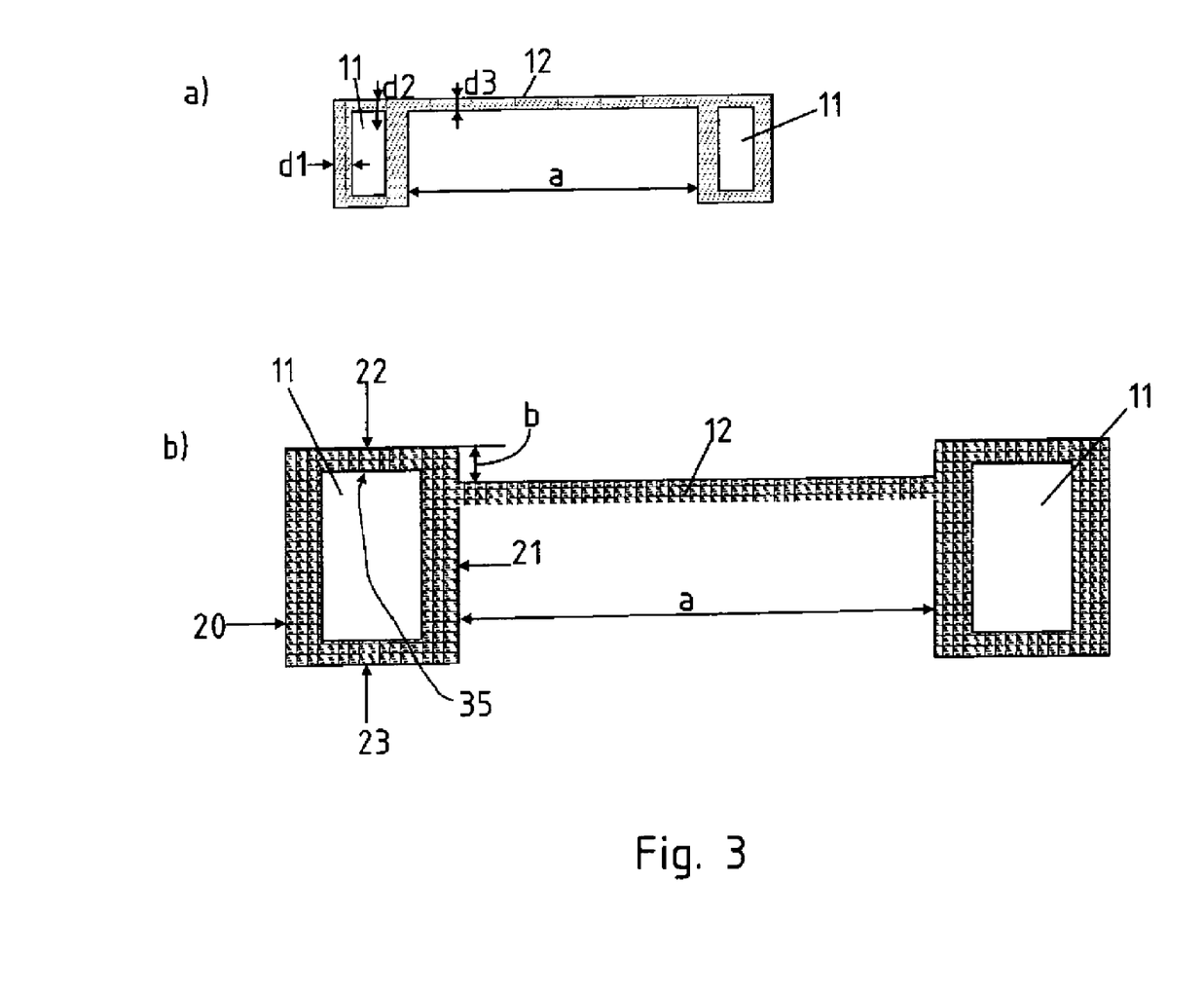

FIGS. 3a and 3b show different cross sectional views of the extruded profile part 10 and illustrate the chambers 11 on the left-hand and right-hand sides of the drawing plane, respectively, and the bridge 12 which interconnects the chambers 11. The chambers 11 are spaced from one another by a distance a. The bridge 12 has hereby a length which corresponds to the distance a. The chambers 11 as well as the bridge 12 have different wall thicknesses d1, d2, d3. The chambers 11 have each a front wall 20, rear wall 21, outer wall 22 and inner wall 23 (cf. FIG. 3b) with respect to a later installation site.

The wall thickness d1, d2, d3 of the chambers 11 and the bridge 12 and of the individual walls may be different and/or the same. The wall thickness d1 may be in a range of 1.5 to 2.5 mm. Currently preferred is a wall thickness d1 of 2 mm. The wall thickness d2 may be in a range of 2.5 to 3.5 mm. Currently preferred is a wall thickness d2 of 2.7 mm. The wall thickness d3 may be in a range of 1.5 to 2.5 mm. Currently preferred is a wall thickness d3 of 2 mm. An example of a material for the extruded profile part 10 includes an aluminum material. Currently preferred are wrought alloys of the 6000 series or 7000 series. FIG. 3a illustrates an extruded profile part 10 of T-shaped cross section between the chambers 11 and the bridge 12, whereas FIG. 3b illustrates an H-shaped cross section, with reference sign b designating a distance between an outer wall of the chamber 11 and the bridge 12.

Figure 4:
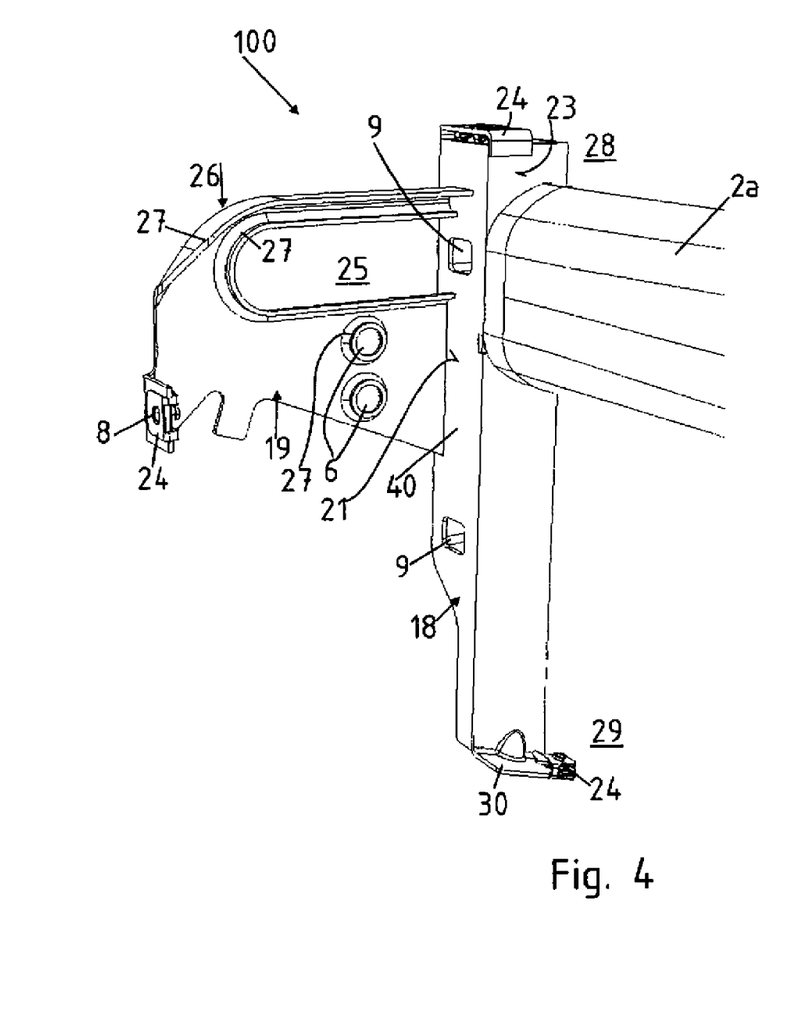
FIG. 4 is a perspective illustration of a section of a dashboard support according to the present invention.

Referring now to FIG. 4, there is shown a perspective illustration of a section of a dashboard support according to the present invention, generally designated by reference numeral 100 and having a mount 40 which has been formed from an extruded profile part 10. The mount 40 has a mounting chamber 18 and an installation plate 19, with the installation plate 19 being formed with transport holes 6. The installation plate 19 further has a mounting hole 8 with a screw plate 24 for a not shown screw fastener for attachment of a dashboard. For simplifying assembly and saving weight, the installation plate 19 has an opening 25. The opening 25 and an upper rim 26 of the installation plate 19 as well as the transport holes 6 have at least one area formed with a collar 27 for reinforcement. Rear wall 21 of the mount 40 and the mounting chamber 18, although not shown in FIG. 4, are further provided with installation holes 9 for attachment of the mount 40 to a not shown A-pillar, using suitable screw fasteners.

The mount 40 has an inner wall 23 for connection to a crossbeam 2a. The upper and lower ends 28, 29 of the mount 40 have each a flange 30 which is also provided with a screw plate 24 for attachment of a dashboard (not shown).

Figure 5:
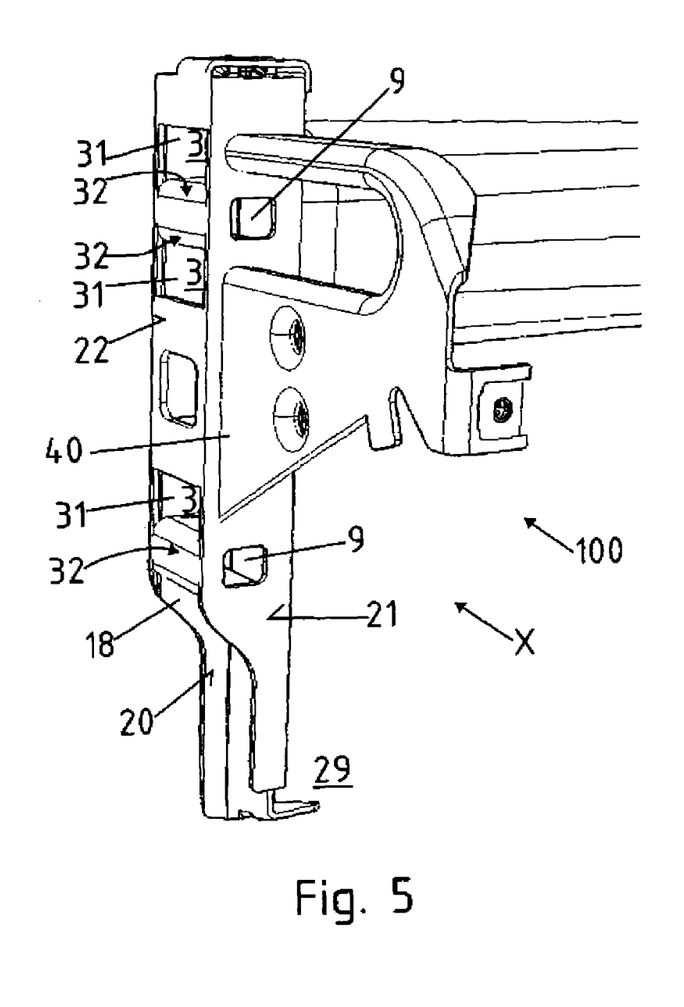
FIG. 5 is a perspective illustration of the section of the dashboard support of FIG. 4 from a different angle.

FIG. 5 is a perspective illustration of the dashboard support 100 from a different angle, depicting the outer wall 22 of the mount 40 in greater detail. The outer wall 22 of the mount 40 is provided with cutouts which are formed with flanges 32 pointing inwardly into the interior space of the mounting chamber 18. The flanges 32 thus serve as spacers between the front and rear walls 20, 21 of the mount 40 and stiffen the area around the installation hole 9. When applying in the region of the installation holes 9 a torque to tighten the screw connection in vehicle X-direction, as indicated by arrow X, the flanges 32 provide support against the applied force. The region of the lower end 29 of the mount 40 is further machined in a way to reduce weight and render it more compact.

Figure 6:
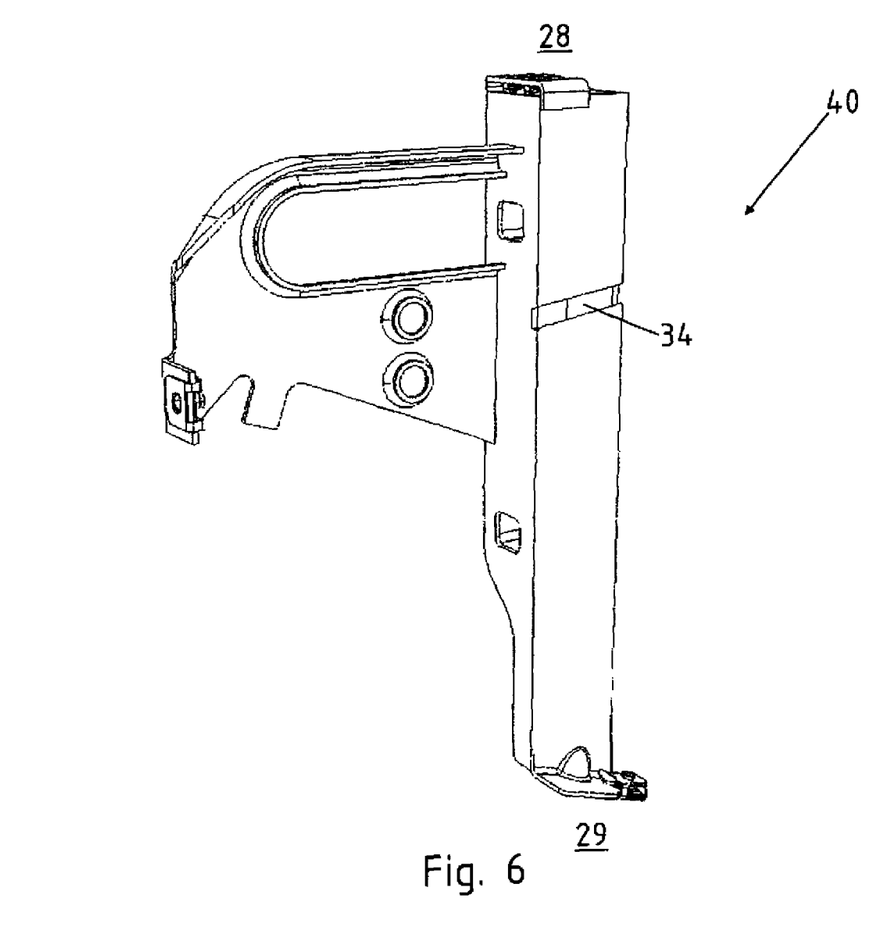
FIG. 6 is a detailed cutaway view of a mount of the dashboard support according to the present invention.

FIG. 6 shows a detailed cutaway view of the mount 40 of the dashboard support 100 according to the present invention, as viewed in a direction as shown in FIG. 4, absent depiction of the crossbeam 2a. A not shown box-shaped or tongue-shaped counter tool is inserted in a slot 34 to provide support as counterpiece for flanges 32, when the flanges 32 are bent inwards. Suitably, the support is provided on an inner side 35 (FIG. 3b) of the outer wall 22. This is required for those flanges 32 that are no longer accessible from the upper end 28 or lower end 29 by a mandrel.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed as new and desired to be protected by Letters Patent is set forth in the appended claims and includes equivalents of the elements recited therein:

1. A method for the production of a dashboard support for a motor vehicle, comprising:
   cutting a blank from an extruded profile part;
   trimming and shaping the blank to form a mount; and
   connecting the mount to an end of a crossbeam for allowing the crossbeam to be coupled via the mount to an A-pillar of the motor vehicle.

2. The method of claim 1, wherein the extruded profile part is made of light metal, and the crossbeam is made of light metal or steel.

3. The method of claim 1, wherein the mount and the crossbeam are connected by a formfit or by a material joint.

4. The method of claim 1, wherein the mount and the crossbeam are connected by a thermal joint.

5. The method of claim 1, wherein the extruded profile part is a hollow section having two chambers disposed in spaced-apart relationship and connected with one another by a bridge to form a single-piece structure.

6. The method of claim 1, further comprising cutting the extruded profile part to a length substantially commensurate with a length of the mount.

7. The method of claim 6, wherein the cutting step includes cutting two blanks from the extruded profile part that has been cut to length.

8. The method of claim 7, wherein the two blanks are cut as mirror images of one another.

9. The method of claim 1, wherein the blank is made of one piece having a mounting chamber and an installation plate which projects out from a side of the mounting chamber.

10. The method of claim 1, wherein the blank is cut from the extruded profile part through laser cutting or water jet cutting or by a punching process.

11. The method of claim 1, further comprising providing the blank with at least one member selected from the group consisting of mounting holes, installation hole, or handling hole.

12. The method of claim 11, further comprising collaring the member at least in one area thereof.

13. The method of claim 1, further comprising forming an installation hole to each of front and rear walls of the mount, and inserting a screw fastener through the installation hole to threadably engage the crossbeam to the A-pillar.

14. The method of claim 13, wherein the screw fastener is oriented in X-direction of the motor vehicle.

15. The method of claim 1, further comprising incising at least one of an outer wall and an inner wall of the mount to form at least one flange, and bending the flange inwardly into an interior space of a mounting chamber of the mount.

16. The method of claim 15, wherein the flange constitutes a spacer to maintain a distance between front and rear walls of the mount.

17. The method of claim 1, further comprising bending at a receiving end of the mount a part of at least one member selected from the group consisting of outer wall, inner wall, front wall, and rear wall of the mount to form an attachment flange for an instrument panel.

18. A dashboard support for a motor vehicle, comprising:
   a crossbeam; and
   a mount connected on one end of the crossbeam and made in one piece,
   wherein the dashboard support is made by a method as set forth in claim 1.

19. The dashboard support of claim 18, wherein the mount is made of light metal, and the crossbeam is made of light metal or steel.

20. The dashboard support of claim 18, wherein the mount and the crossbeam are connected by a formfit or by a material joint.

21. The dashboard support of claim 18, wherein the mount has a mounting chamber and a installation plate which projects from a side of the mounting chamber.

22. The dashboard support of claim 18, wherein the mount has an outer wall and an inner wall, at least one of the outer and inner walls having at least one flange extending into an interior space of the mounting chamber of the mount.

23. The dashboard support of claim 22, wherein the flange maintain a distance between front and rear walls of the mount.

* * * * *